US009729748B1

(12) United States Patent
Noren et al.

(10) Patent No.: US 9,729,748 B1
(45) Date of Patent: Aug. 8, 2017

(54) MULTI-FUNCTION PRINTING DEVICE HAVING LIGHT GUIDES BETWEEN PRINTING ENGINE AND SCANNER FOR MEASUREMENT OF PRINT ENGINE OR OTHER PARAMETERS

(71) Applicant: Xerox Corporation, Norwalk, CT (US)

(72) Inventors: Andrew S. Noren, Hemel Hempstead (GB); David R. Ascroft, Welwyn Garden City (GB); Simon J. Gray, Westoning (GB); Peter D. Fraser, Watford (GB); John K. Mangan, St Albans (GB); Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/012,974

(22) Filed: Feb. 2, 2016

(51) Int. Cl.
*G06T 5/00* (2006.01)
*H04N 1/04* (2006.01)
*H04N 1/028* (2006.01)

(52) U.S. Cl.
CPC ..... *H04N 1/02835* (2013.01); *H04N 1/02805* (2013.01); *H04N 2201/0094* (2013.01)

(58) Field of Classification Search
CPC ........... H04N 1/02835; H04N 1/02805; H04N 2201/0094
USPC ................................ 358/3.26, 474, 406, 504
See application file for complete search history.

(56) References Cited

U.S. PATENT DOCUMENTS

| 5,032,874 | A | 7/1991 | Matsuuchi |
| 5,274,423 | A | 12/1993 | Kusumoto |
| 5,325,150 | A * | 6/1994 | Rottner ................. G03B 27/80 355/38 |
| 5,438,349 | A | 8/1995 | Fox et al. |
| 5,742,870 | A | 4/1998 | Hwang |
| 5,884,118 | A | 3/1999 | Mestha et al. |
| 6,188,854 | B1 | 2/2001 | Coleman et al. |
| 6,776,543 | B1 | 8/2004 | Hall et al. |
| 6,866,367 | B2 | 3/2005 | Szumla |
| 6,985,254 | B2 | 1/2006 | Allen et al. |
| 7,239,302 | B2 * | 7/2007 | Kim ..................... G06F 1/1626 345/165 |
| 7,817,290 | B2 * | 10/2010 | Klassen ................ G03G 15/50 358/1.13 |
| 8,411,329 | B2 | 4/2013 | Hoover |
| 9,316,538 | B2 * | 4/2016 | Kanai ................... G01J 3/0218 |
| 2001/0012134 | A1 | 8/2001 | Han |

(Continued)

FOREIGN PATENT DOCUMENTS

JP   08114956 A  *  5/1996
JP   11147353 A  *  6/1999

*Primary Examiner* — Cheukfan Lee
(74) *Attorney, Agent, or Firm* — Gibb & Riley, LLC (57) ABSTRACT

An apparatus has an optical scanner generating image signals, and a processor electrically connected to the optical scanner. The processor converts the electrical signals into image data. Also, a printing engine is electrically connected to the processor, and a light guide is positioned between the printing engine and the optical scanner. The optical scanner generates operating condition signals when optically scanning the light guide. The optical scanner transmits the operating condition signals to the processor, and the processor adjusts operations of the printing engine based on the operating condition signals.

20 Claims, 7 Drawing Sheets

(56) References Cited

U.S. PATENT DOCUMENTS

2007/0248374 A1* 10/2007 Burger ............... G03G 15/6564
                                                         399/82
2009/0190187 A1    7/2009 Cornell et al.
2014/0218776 A1*  8/2014 Huang ............... H04N 1/00127
                                                        358/484

* cited by examiner

MULTI-FUNCTION PRINTING DEVICE HAVING LIGHT GUIDES BETWEEN PRINTING ENGINE AND SCANNER FOR MEASUREMENT OF PRINT ENGINE OR OTHER PARAMETERS

BACKGROUND

Systems and methods herein generally relate to printing devices, and more particularly to multi-function printing device having a printing engine and scanner.

A printing device that includes a scanner (and other devices, such as facsimile equipment) is often referred to as a multi-function printing device (MFD). A typical multi-function printing device controls various components in order to accurately mark, or print, an image onto print media. For example, the print engine can employ image sensors as part of its control system; however, such image sensors are fairly costly.

SUMMARY

An exemplary apparatus herein includes (among other components) a scanner platen that has an image area, and a border area surrounding the image area. An optical scanner (e.g., containing an array of light sensors) is positioned adjacent the platen. The optical scanner generates image signals when optically scanning items on the image area of the platen. Also, a processor is electrically connected to the optical scanner. The processor converts the electrical signals into image files of the items scanned. Additionally, a printing engine is electrically connected to the processor. The printing engine prints the image files on print media. Further, a light guide (e.g., a fiber-optic cable) is positioned between the printing engine and the optical scanner, at the border area of the platen.

The optical scanner generates operating condition signals of the printing engine when optically scanning one of possibly many light guides at the border area of the platen. For example, the operating condition signals can be temperature signals, luminance level signals, consumable supply levels, etc., that indicate an operational condition of the printing engine. The operating condition signals are based on the light transmitted from the printing engine to the optical scanner through the light guide. The optical scanner transmits the operating condition signals to the processor, and the processor adjusts operations of the printing engine based on the operating condition signals. For example, the processor adjusts operations of the printing engine by altering voltages, mechanical positions, timings, operating speeds, etc., of the printing engine.

Exemplary methods herein scan items positioned on an image area of a platen of a multi-function printing device using an optical scanner of the multi-function printing device, while an illumination source of the scanner is illuminated. In turn, these methods output image signals from the optical scanner to a processor of the multi-function printing device, based on the light received by the scanner during the scanning. Such methods can then generate an image file from the image signals using the processor.

In a different operation, these methods move the optical scanner to be adjacent one of possibly many light guides of the multi-function printing device. The scanner sensor is arranged such that light from the light guide is directed to the scanner sensor, for example by an angled mirror and lens. The light guide is positioned between the printing engine and the optical scanner at a border area of the platen, and the border area surrounds the image area. Here, these methods deactivate the illumination source if required, operate a printing engine of the multi-function printing device, and detecting light from the light guide using the scanner (e.g., while the scanner is adjacent the light guide, the illumination source is deactivated if required, and the printing engine is operating). The light guide can also direct the scanner illumination and hence it is possible to read, for example, an image area on the photoreceptor for calibration. Thus, these methods output operating condition signals from the optical scanner to the processor based on light received by the scanner during the process of detecting light from the light guide. Also, these methods process the operating condition signals using the processor to determine the operating conditions of the printing engine. This allows these methods to adjust operations of the printing engine based on the operating condition signals, using the processor (e.g., by altering at least one of voltages, mechanical positions, timings, operating speeds, etc., of the printing engine).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, sensors used as part of a control system for a multi-function printing device are fairly costly. Therefore, the systems and methods herein use the already fitted scanner to replace multiple print engine image sensors, with one or more light guides from the print engine, thereby reducing the overall cost of the multi-function printing device. In addition, the scanner can be used to provide a more accurate control system, in multi-function printing device where the sensors have been removed (due to cost) and replaced by dead reckoning (open loop) systems. With such devices, only a relative measurement is required from a pre-calibrated value, and therefore, accurate alignment and focusing of light guides is not required.

In greater detail, the devices herein direct light radiation from the print engine to the scanner using fiber optic cabling. This replaces conventional stand-alone light or heat sensitive sensors. Different types of electro-magnetic radiation could be transmitted through the light guides to the scanner. For example, in addition to human-visible light, infrared light, or a specific color can be detected (using different filtration). At the scanner, the radiation captured is directed onto the existing scan carriage (potentially at multiple positions) by additional holes and a mirror. Devices herein can also focus the image from the light guide, but this is not essential for a relative light measurement because only light output is being measured (hence, the scanner reading can be calibrated against this measurement to get a more representative reading).

Figure 1:
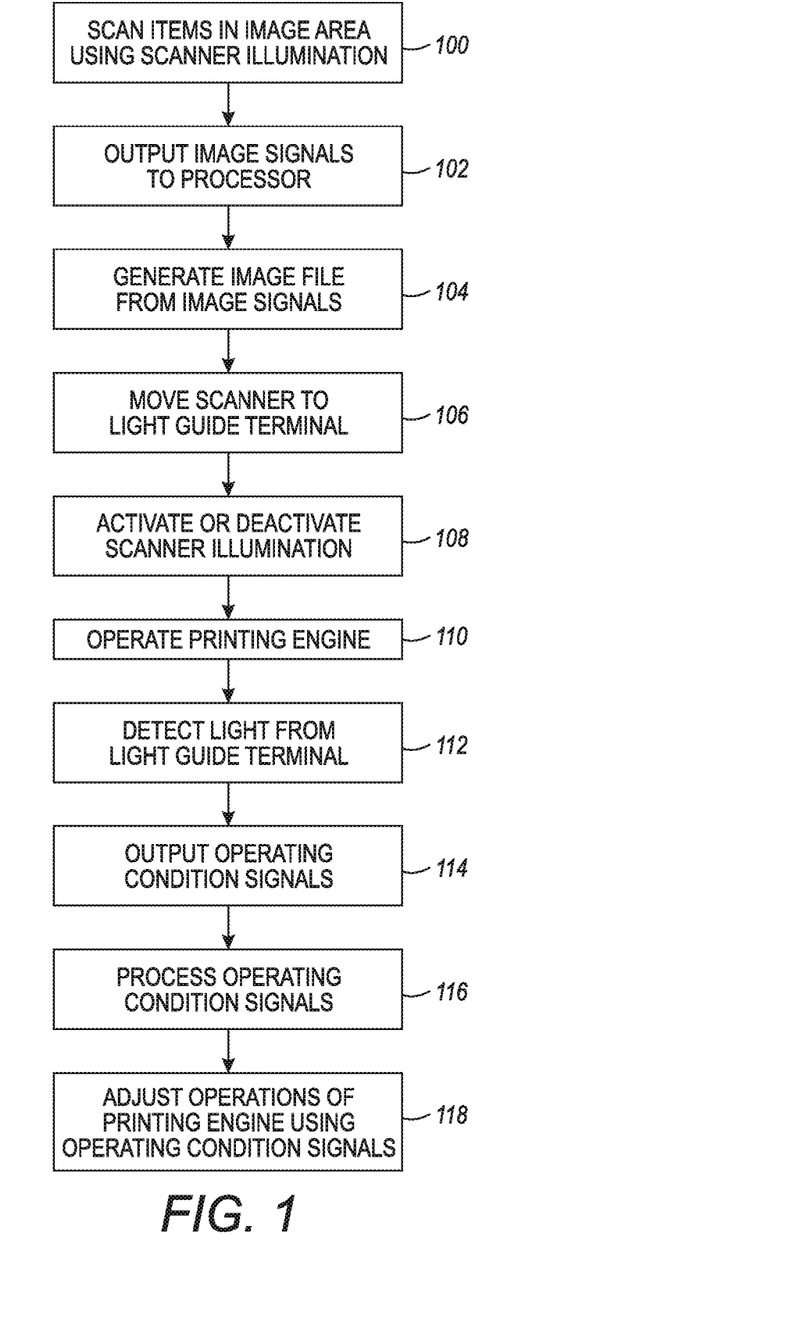
FIG. 1 is a flow diagram of various methods herein.

As shown in flowchart form in FIG. 1, during processing herein, items positioned on an image area of a platen of a multi-function printing device are automatically scanned using an optical scanner of the multi-function printing device, while an illumination source of the scanner is automatically illuminated (FIG. 1, item 100). In turn, as shown in item 102, image signals are automatically output from the optical scanner to a processor of the multi-function printing device, based on the light received by the scanner during the scanning. The processor can then automatically generate an image file from the image signals, as shown in item 104, so that the image file can be printed, saved, transmitted, etc.

In a different operation, as shown in item 106, the optical scanner automatically moves to be adjacent one of potentially many light guides of the multi-function printing device. The light guide is positioned between the printing engine and the optical scanner (potentially at an otherwise unused border area of the platen, and this border area surrounds the image area of the platen). Here, the illumination source is automatically activated or deactivated if needed (108). In item 108, the optical scanner illumination source can be activated to direct light to the printing engine through the optical fiber(s) to provide light for activities such as scanning a patch or an image on the drum, etc. Alternatively, the optical scanner illumination source can be deactivated in item 108 to avoid interfering with the process of sensing lower intensity light transmitted from the printing engine through the optical fiber(s).

Subsequently, a printing engine of the multi-function printing device is automatically operated (110), and light from the light guide is detected by the scanner (112). Therefore, light from the light guide is detected by the scanner in item 112 while the scanner is adjacent the light guide, the illumination source is activated or deactivated if needed, and the printing engine is operating.

In item 114, the optical scanner therefore automatically outputs operating condition signals to the processor based on the light received by the scanner (during the process of detecting light from the light guide 112). Also, as shown in item 116, the processor automatically interprets and processes the operating condition signals from the scanner to determine the operating conditions of the printing engine. This allows the processor to automatically adjust operations of the printing engine based on the operating condition signals (e.g., by altering at least one of voltages mechanical positions, timings, operating speeds, etc., of the printing engine) in item 118.

Figure 2:
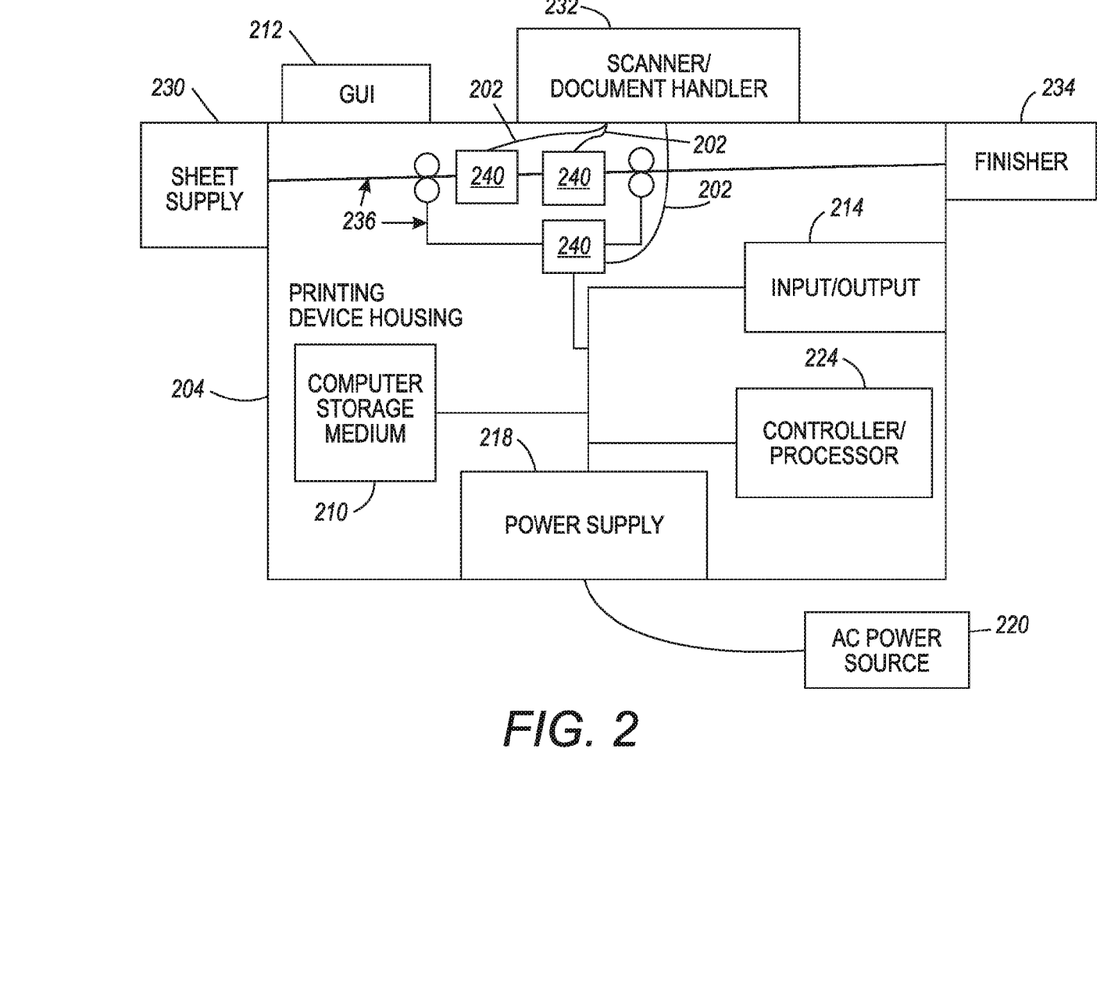
FIG. 2 is a schematic diagram illustrating devices herein.

FIG. 2 illustrates a printing device 204, which can be used with systems and methods herein and can comprise, for example, a printer, copier, multi-function machine, multi-function device (MFD), etc. The printing device 204 includes a controller/specialized image processor 224 and a communications port (input/output) 214 operatively connected to the specialized image processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The specialized image processor 224 controls the various actions of the computerized device. A non-transitory, tangible, computer storage medium device 210 (which can be optical, magnetic, capacitor based, etc., and is different from a transitory signal) is readable by the specialized image processor 224 and stores instructions that the specialized image processor 224 executes to allow the computerized device to perform its various functions, such as those described herein. Thus, as shown in FIG. 2, a body housing has one or more functional components that operate on power supplied from an alternating current (AC) source 220 by the power supply 218. The power supply 218 can comprise a common power conversion unit, power storage element (e.g., a battery, etc), etc.

The printing device 204 also includes at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Thus, in printing devices herein, a latent image can be developed with developing material to form a toner image corresponding to the latent image. Then, a sheet is fed from a selected paper tray supply to a sheet transport for travel to a transfer station. There, the image is transferred to a print media material, to which it may be permanently fixed by a fusing device. The print media is then transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

Figure 3:
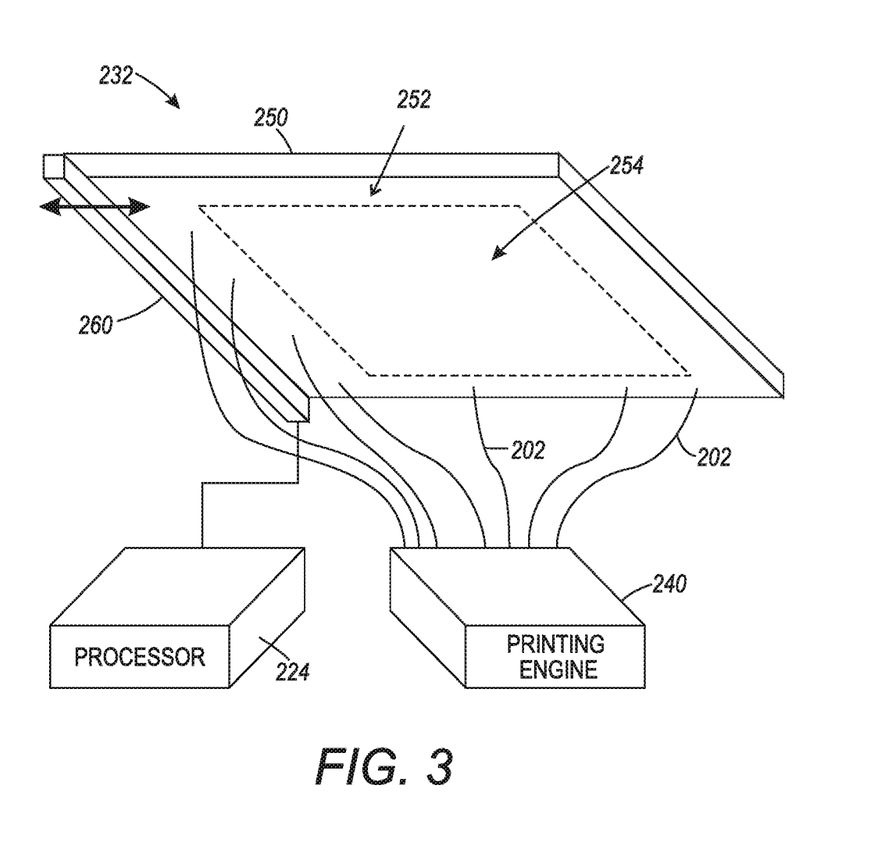
FIG. 3 is a schematic diagram illustrating devices herein.

FIG. 3 illustrates a portion of the document handler 232 in greater detail. More specifically, FIG. 3 shows that the document handler 232 includes a platen 250. FIG. 3 is a perspective view showing the bottom side of the scanner platen 250 (where items to be scanned would be placed on the opposite side of the platen 250). As shown, the platen 250 has an image area 254 in the middle of the platen, where items to be scanned are placed, and a border area 252 outside (e.g., surrounding) the more central image area 254.

FIG. 3 also illustrates an optical scanner 260 that is positioned adjacent the platen 250. As shown in greater detail in FIGS. 4A-4C, the optical scanner 260 contains an illumination source 268 (incandescent, LED, HID, etc.) and an array of image sensors 262. In one example, the image sensor array 262 can be an array of charge-coupled devices (e.g., CCD), complementary metal oxide semiconductor (CMOS) devices, N-type metal oxide semiconductors (NMOS) devices, contact image sensor (e.g. CIS), etc. The optical scanner 260 generates image signals when optically scanning items (such as item 272, shown in FIGS. 4A and 4B) that are positioned within the image area 254 of the platen 250.

Also, as shown in FIG. 3, the processor 224 is electrically connected to the optical scanner 260. The processor 224 converts the electrical signals into image files of the items 272 scanned. Additionally, as shown in FIG. 3, the printing engine 240 is electrically connected to the processor 224. The printing engine 240 can, for example, print such image files on print media.

Figure 4A:
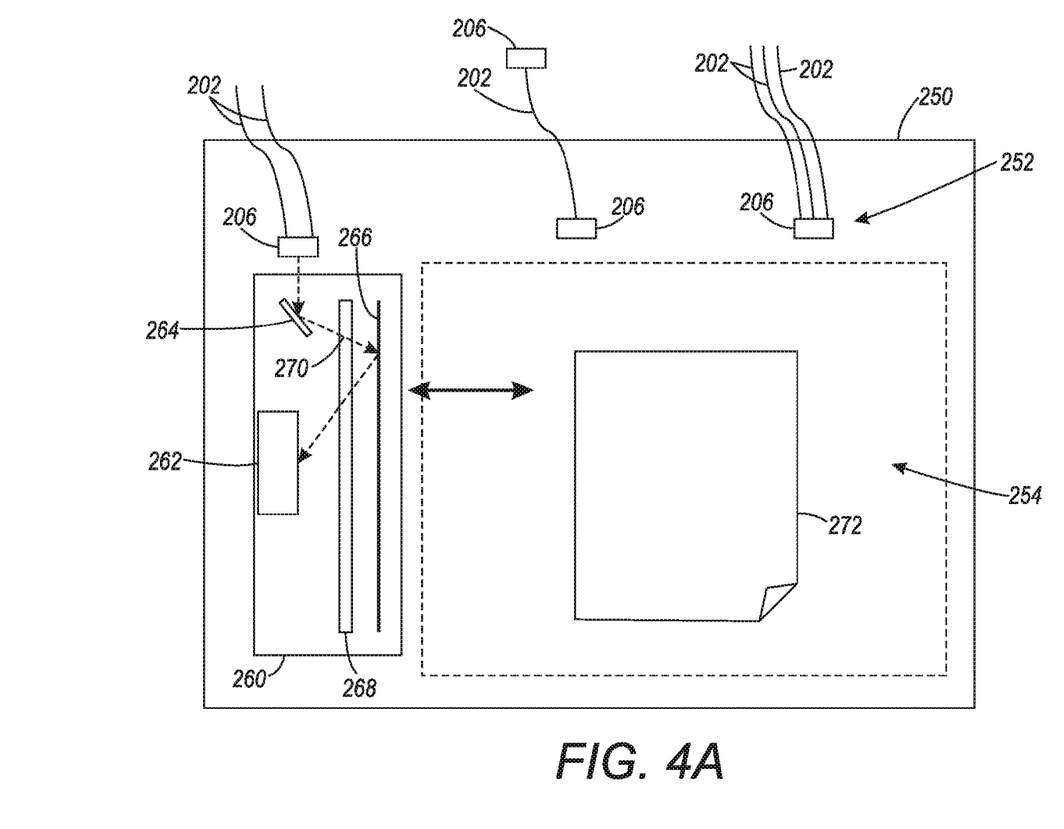
FIGS. 4A-4C are schematic diagrams illustrating devices herein.
Figure 4B:
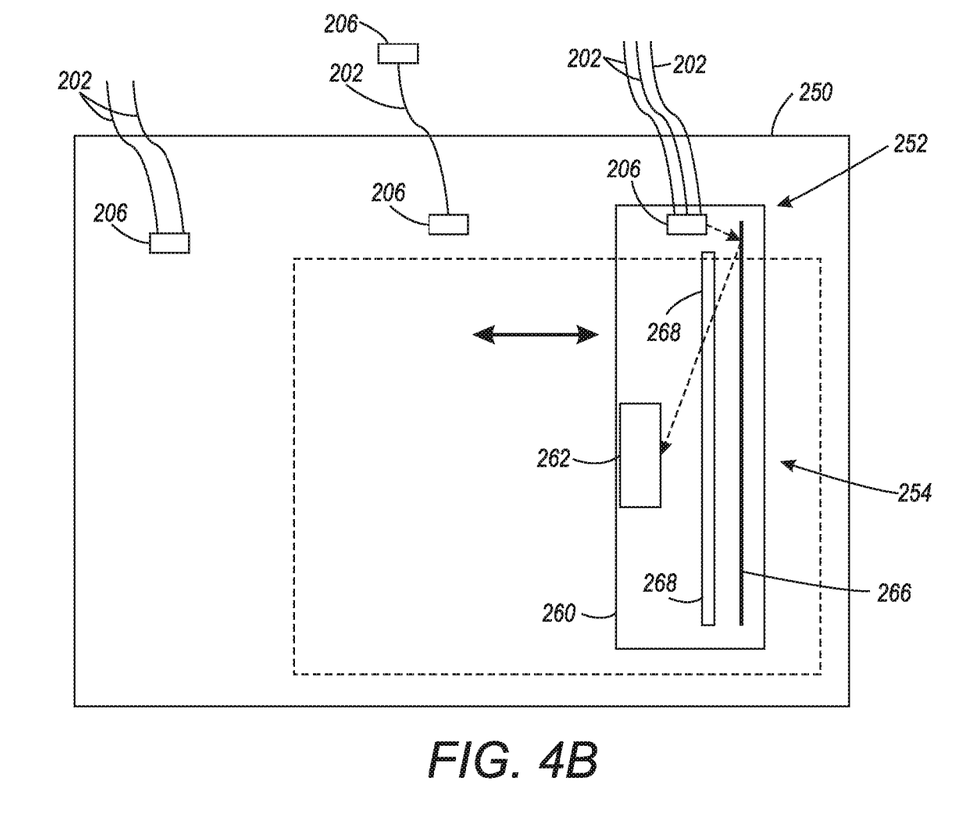
Figure 4C:
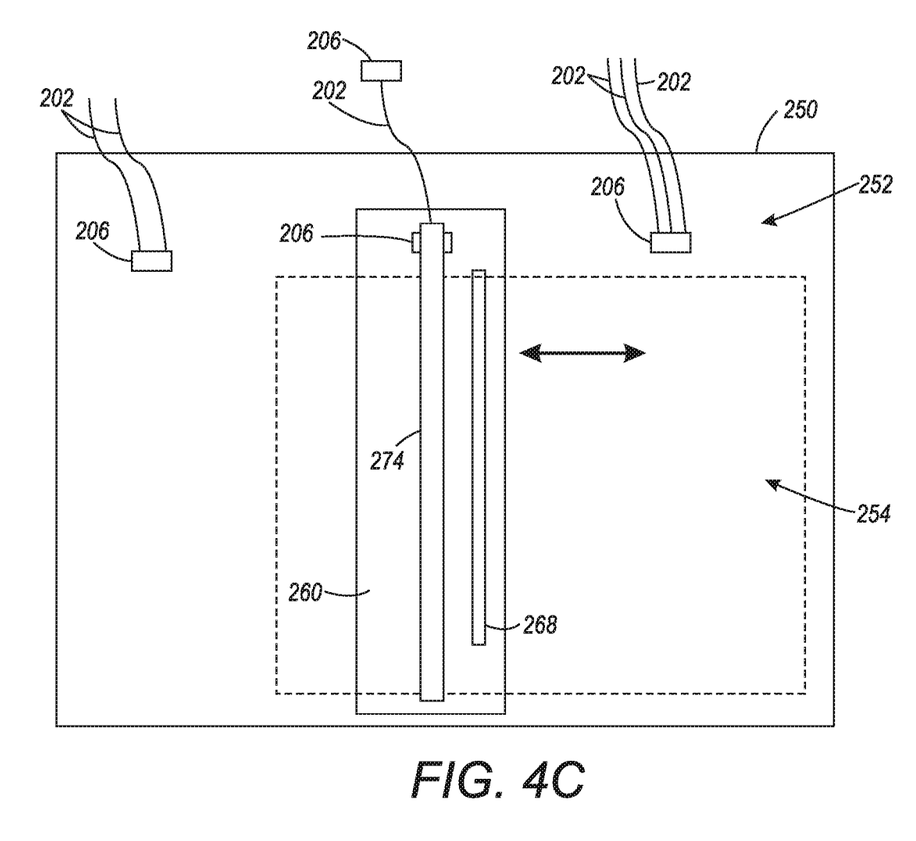

FIGS. 3-4C also illustrate one or more light guides 202 that run between (are positioned between) the printing engine 240 and the optical scanner 260. As would be understood by those ordinarily skilled in the art, the waveguides or light guides 202 can include any form of light directing/transmitting device including glass or plastic optical fibers of light transmitting material (fiber optics or fiberscopes), light tubes (hollow tubes coated with a reflective material), prism light guides, etc. Light guide terminals 206 can also be connected to one or more of the light guides 202, and can be used on either, or both, ends of the light guides. Such light guide terminals 206 can include optical features (such as lenses, shaped openings, etc.) that focus the light being output from the terminals 206.

As shown in FIGS. 3-4B, the light guides 202 can be positioned to terminate in different locations of the border area 252 of the platen 250. Placing the light guides 202 outside the image area 254 allows the light guides 202 to avoid interfering with items 272 that are being scanned within the image area. By placing the light guides 202 in the border area 252, the optical scanner 260 can detect light output from the light guides 202, either through the user of mirrors (shown in FIG. 4A) or by the optical scanner 260 extending over the border area (FIG. 4B).

In the example shown in FIG. 4A, a secondary mirror 264 can be used to reflect the light (shown as a dashed arrows 270 in the drawings) from the light guide terminal 206 to the main mirror 266 of the scanner 260, so that the light 270 is detected by the image sensor array 262 (the light is not blocked by the illumination source 268, as it is positioned out of the reflection path). In the example shown in FIG. 4B, the carriage containing the optical scanner 260 is repositioned over one of the multiple terminals 206, and is long enough to extend over the terminal 206, and this allows light from the light guides 206 to be directed to the image sensors 262 using the main mirror. In the example shown in FIG. 4C, the carriage containing the optical scanner 260 is repositioned over a different one of the multiple terminals 206, and has a full width array light sensor 274 that is long (wide in the cross-process direction) enough to extend over the terminal 206, and this allows light from the light guides 206 to be directed directly by the full width array light sensor 274. Alternatively, in the example shown in FIG. 3, the scanner 260 can be moved to be positioned over multiple light guides 202 that are positioned along a line that is parallel to the length of the scanner 206, and that transmit light to different positions vertically along the length of the scanner 260. This example in FIG. 3 allows the scanner 260 to detect light from each different light guide 202 sequentially or simultaneously without using mirrors and without the scanner 206 moving, because the scanner can be positioned to be simultaneously adjacent multiple light guides 202. Those ordinarily skilled in the art would understand that these are only a few of many different structures and arrangements that could be used to direct the light from the light guide terminal 206 into the image sensors 262, and the claims at the end of this application are intended to cover all such structures and arrangements and not to be limited to the examples shown in the drawings.

Figure 5:
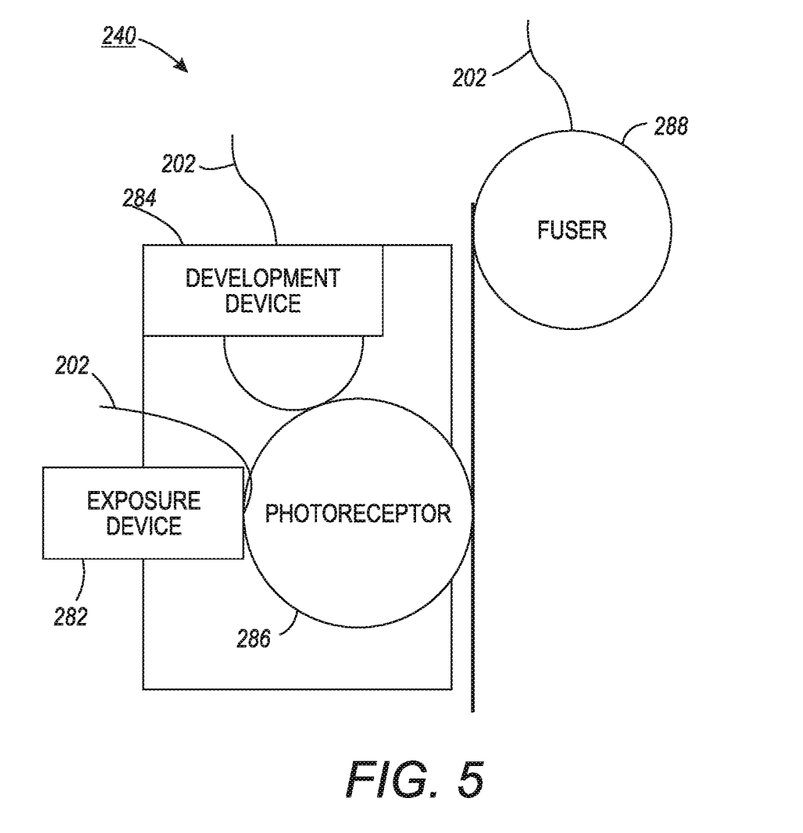
FIG. 5 is a schematic diagram illustrating devices herein.

The optical scanner 260 generates operating condition signals of the printing engine 240 when optically scanning the light guide 202 at the border area 252 of the platen 250. Such operating condition signals can be temperature signals, luminance level signals, consumable supply levels, etc., that indicate an operational condition of the printing engine 240. For example, as shown in FIG. 5 (which shows some components of an exemplary printing engine 240) the temperature of the fuser 288 can be measured according to the infrared light energy or levels transmitted to the image sensor 262 through the light guide 202; the luminance level output from the exposure device 282 transmitted through the light guide 202 can be measured by the image sensor 262; light passing through a transparent toner container of the development device 284 (which transfers toner to the photoreceptor 286) can be transmitted through the light guide 202 and measured by the image sensor 262 to evaluate the quantity of toner therein; etc.

Thus, the operating condition signals are based on the light transmitted from the components of the printing engine 240 to the optical scanner 260 through the light guide 202. The optical scanner 260 transmits the operating condition signals to the processor 224, and the processor 224 adjusts operations of the printing engine 240 based on the operating condition signals. For example, the processor 224 adjusts operations of the printing engine 240 by altering voltages, temperatures, mechanical positions, timings, operating speeds, etc. of the printing engine 240, outputting messages to refill consumables, etc.

As would be understood by those ordinarily skilled in the art, the printing device 204 shown in the figures is only one example and the systems and methods herein are equally applicable to other types of printing devices that may include fewer components or more components. For example, while a limited number of printing engines and paper paths are illustrated in FIG. 2, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a platen having a border area;
   an optical scanner generating image signals when scanning items on said platen;
   a processor electrically connected to said optical scanner, said processor converting said image signals into image data;
   a printing engine electrically connected to said processor; and
   a light guide positioned between said printing engine and said optical scanner at said border area of said platen,
   said optical scanner generating operating condition signals when optically scanning said light guide at said border area of said platen,
   said optical scanner transmitting said operating condition signals to said processor, and
   said processor adjusting operations of said printing engine based on said operating condition signals.

2. The apparatus according to claim 1, said operating condition signals comprising at least one of temperature signals, luminance level signals, and consumable supply level signals that indicate an operational condition of said printing engine.

3. The apparatus according to claim 1, said operating condition signals being based on light transmitted from said printing engine to said optical scanner through said light guide.

4. The apparatus according to claim 1, said processor adjusting operations of said printing engine by altering at least one of voltages mechanical positions, timings, and operating speeds of said printing engine.

5. The apparatus according to claim 1, said optical scanner comprising an array of light sensors and said light guide comprising a fiber-optic cable.

6. An apparatus comprising:
   a platen having a border area;
   an optical scanner generating image signals when optically scanning items on said platen;
   a processor electrically connected to said optical scanner, said processor converting said image signals into image files;
   a printing engine electrically connected to said processor, said printing engine printing said image files on print media; and
   a light guide positioned between said printing engine and said optical scanner at said border area of said platen,
   said optical scanner generating operating condition signals when optically scanning said light guide at said border area of said platen,
   said optical scanner transmitting said operating condition signals to said processor, and
   said processor adjusting operations of said printing engine based on said operating condition signals.

7. The apparatus according to claim 6, said operating condition signals comprising at least one of temperature signals, luminance level signals, and consumable supply level signals that indicate an operational condition of said printing engine.

8. The apparatus according to claim 6, said operating condition signals being based on light transmitted from said printing engine to said optical scanner through said light guide.

9. The apparatus according to claim 6, said processor adjusting operations of said printing engine by altering at least one of voltages mechanical positions, timings, and operating speeds of said printing engine.

10. The apparatus according to claim 6, said optical scanner comprising an array of light sensors and said light guide comprising a fiber-optic cable.

11. A multi-function printing device comprising:
    a platen having an image area, and a border area surrounding said image area;
    an optical scanner positioned adjacent said platen, said optical scanner generating image signals when optically scanning items on said image area of said platen;
    a processor electrically connected to said optical scanner, said processor converting said image signals into image files;
    a printing engine electrically connected to said processor, said printing engine printing said image files on print media; and
    a light guide positioned between said printing engine and said optical scanner at said border area of said platen,
    said optical scanner generating operating condition signals when optically scanning said light guide at said border area of said platen,
    said optical scanner transmitting said operating condition signals to said processor,
    said processor adjusting operations of said printing engine based on said operating condition signals.

12. The multi-function printing device according to claim 11, said operating condition signals comprising at least one of temperature signals, luminance level signals, and consumable supply level signals that indicate an operational condition of said printing engine.

13. The multi-function printing device according to claim 11, said operating condition signals being based on light transmitted from said printing engine to said optical scanner through said light guide.

14. The multi-function printing device according to claim 11, said processor adjusting operations of said printing engine by altering at least one of voltages mechanical positions, timings, and operating speeds of said printing engine.

15. The multi-function printing device according to claim 11, said optical scanner comprising an array of light sensors and said light guide comprising a fiber-optic cable.

16. A method comprising:
scanning items positioned on an image area of a platen of a multi-function printing device using an optical scanner of said multi-function printing device while an illumination source of said optical scanner is illuminated;
outputting image signals from said optical scanner to a processor of said multifunction printing device based on light received by said optical scanner during said scanning;
generating an image file from said image signals using said processor;
moving said optical scanner to be adjacent one or more light guides of said multifunction printing device, said one or more light guides being positioned between a printing engine of said multi-function printing device and said optical scanner at a border area of said platen, and said border area surrounding said image area;
activating or deactivating said illumination source;
operating said printing engine;
detecting light from said one or more light guides using said optical scanner while said optical scanner is adjacent said one or more light guides, said illumination source is activated or deactivated, and said printing engine is operating;
outputting operating condition signals from said optical scanner to said processor based on light received by said optical scanner during said detecting light from said one or more light guides;
processing said operating condition signals using said processor to determine an operating condition of said printing engine; and
adjusting operations of said printing engine based on said operating condition signals, using said processor.

17. The method according to claim 16, said operating condition signals comprising at least one of temperature signals, luminance level signals, and consumable supply level signals that indicate an operational condition of said printing engine.

18. The method according to claim 16, said operating condition signals being based on light transmitted from said printing engine to said optical scanner through said light guides.

19. The method according to claim 16, said adjusting operations of said printing engine comprising altering at least one of voltages mechanical positions, timings, and operating speeds of said printing engine.

20. The method according to claim 16, said optical scanner comprising an array of light sensors and said light guides comprising a fiber-optic cable.

* * * * *